United States Patent
Kabasawa et al.

(10) Patent No.: US 7,193,344 B2
(45) Date of Patent: Mar. 20, 2007

(54) WIRING STRUCTURE OF HYBRID VEHICLE MOTOR

(75) Inventors: Akira Kabasawa, Kawachi-gun (JP); Satoshi Shikata, Moka (JP); Kenji Fukuda, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 228 days.

(21) Appl. No.: 10/487,420

(22) PCT Filed: Aug. 23, 2002

(86) PCT No.: PCT/JP02/08508

§ 371 (c)(1),
(2), (4) Date: Feb. 23, 2004

(87) PCT Pub. No.: WO03/021747

PCT Pub. Date: Mar. 13, 2003

(65) Prior Publication Data
US 2004/0206558 A1 Oct. 21, 2004

(30) Foreign Application Priority Data
Sep. 3, 2001 (JP) ............. 2001-266343

(51) Int. Cl.
*H02K 11/00* (2006.01)
*H02K 9/20* (2006.01)
*B60K 1/00* (2006.01)

(52) U.S. Cl. ............. 310/71; 310/54; 180/65.2
(58) Field of Classification Search ............. 310/54, 310/71, 58; 180/65.2

See application file for complete search history.

(56) References Cited

U.S. PATENT DOCUMENTS

| | | | | |
|---|---|---|---|---|
| 2,862,122 A | * | 11/1958 | Courtin et al. ............. | 310/87 |
| 4,712,029 A | * | 12/1987 | Nold ............. | 310/71 |
| 5,172,006 A | * | 12/1992 | Suzuki et al. ............. | 290/45 |
| 5,573,079 A | | 11/1996 | Suda et al. | |
| 6,087,746 A | * | 7/2000 | Couvert et al. ............. | 310/60 R |
| 6,116,346 A | * | 9/2000 | Hasegawa ............. | 168/23 |
| 6,359,354 B1 | * | 3/2002 | Watanabe et al. ............. | 310/87 |
| 6,481,517 B1 | * | 11/2002 | Kobayashi et al. ............. | 180/65.3 |
| 6,533,696 B1 | * | 3/2003 | Takenaka et al. ............. | 475/150 |
| 2002/0121817 A1 | * | 9/2002 | Weimer ............. | 310/54 |

FOREIGN PATENT DOCUMENTS

| | | |
|---|---|---|
| EP | 1 067 003 | 1/2001 |
| EP | 1 093 958 | 4/2001 |
| JP | 50-91004 | 8/1975 |

(Continued)

*Primary Examiner*—Burton S. Mullins
*Assistant Examiner*—Erik Preston
(74) *Attorney, Agent, or Firm*—Westerman, Hattori, Daniels & Adrian, LLP.

(57) ABSTRACT

A wiring structure for a hybrid vehicle motor 3 arranged between an internal combustion engine 1 and a transmission 2 comprises; an electrically conductive member 6 which performs collecting and distributing electricity for a coil 29 of the hybrid vehicle motor 3, a connection terminal 8 which electrically connects the electrically conductive member 6 and a power source cable 7, and a terminal box 9 accommodating the connection terminal 8. The electrically conductive member 6 extends from the hybrid vehicle motor 3 to the transmission 2 side, and the terminal box 9 is provided so as to extend to the transmission 2 side. As a result maintenance for the power source cable is improved, and production costs lowered.

4 Claims, 6 Drawing Sheets

FOREIGN PATENT DOCUMENTS

| | | |
|---|---|---|
| JP | 3-538 | 1/1991 |
| JP | 8-26125 | 1/1996 |
| JP | 10-42404 | 2/1998 |
| JP | 2000-299960 | 10/2000 |
| JP | 2001-18668 | 1/2001 |
| JP | 2001-25187 A | 1/2001 |
| JP | 2001-119810 | 4/2001 |

* cited by examiner

WIRING STRUCTURE OF HYBRID VEHICLE MOTOR

BACKGROUND OF THE INVENTION

1. Field of the Invention

The present invention relates to a wiring structure for a hybrid vehicle motor.

2. Description of the Related Art

A system is known which selectively uses either both or one of the driving force of an internal combustion engine and the driving force of a motor, as a drive format for a hybrid vehicle.

For the motor of the hybrid vehicle drive unit according to this drive format, as disclosed in Japanese Unexamined Patent Application, First Publication No. 2001-25187, an alternating current motor is used arranged between an internal combustion engine and a transmission, with a rotor thereof connected to the crankshaft of the internal combustion engine.

As shown in FIG. 6, for a stator 51 of a hybrid vehicle motor 50, a device is used where multiple stator units 56 made by winding coils 55 via an insulation member 54 around pole teeth 53 formed by laminating magnetic steel plates 52, are arranged around the circumferential direction to thereby give a configuration constructed in a ring shape arranged around the periphery of a rotor 57.

This stator 51 is retained in a ring shape by being fitted to an approximately cylindrical stator retaining ring 58, and in this condition, is accommodated within a cast motor housing 59. Moreover, regarding the coils 55 of each stator unit 56 constituting the stator 51, the same phase pairs are mutually connected by an annular bus ring 60 arranged on one axial end face of the stator 51.

A radially penetrating opening 61 is provided in the motor housing 59, and an electrically conductive member 62 connected to each bus ring 60 passes through this opening 61 and extends to outside of the motor housing 59. The electrically conductive member 62 has on a surface thereof, for example, an insulating coating of a fluorocarbon resin material.

Moreover, on an upper part of the motor housing 59 a connection terminal 64 is provided for connecting a power source cable 63 for supplying electrical power from the outside to the motor 50, and there is arranged a terminal box 65 for accommodating the connection terminal 64. The electrically conductive member 62 is also connected to the connection terminal 64. As a result, the power source cable 63 is connected to each coil 55 through the electrically conductive member 62 and the bus ring 60.

The terminal box 65 comprises a sidewall which surrounds the connection terminal 64 by extending part of the material constituting the motor housing 59 radially outwards, and a cover 67 fitted so as to cover an opening 66 formed at the top of the sidewall. Moreover, a wiring opening 68 is provided in a part of the sidewall, through which the power source cable 63 passes.

The wiring operation for the conventional hybrid vehicle motor 50 constructed in this way is performed with the cover 67 off and the terminal box 65 open, by fastening to the connection terminal 64 by a bolt 69, one end of the electrically conductive member 62 extending from the opening 61 of the motor housing 59, and one end of the power source cable 63 arranged inside the terminal box 65 through the wiring opening 68. Then, after connecting the power source cable 63 and the electrically conductive member 62, the cover 67 is shut and the terminal box 65 sealed to thereby prevent flooding etc. into the connection parts.

However, in the conventional wiring structure for the hybrid vehicle motor 50 constructed in this way, there are the following problems.

Firstly, because the hybrid vehicle motor 50 of the above structure is arranged adjacent to the internal combustion engine 70, then auxiliary equipment and piping and the like fitted to the internal combustion engine 70 is arranged near the surface of the motor housing 65, in particular, a coupling 71 for cooling piping is arranged on the upper face of the motor housing 65 which is easily accessed from the outside. Therefore, the upper face of the terminal box 65 of the hybrid vehicle motor 50 is completely covered which is inconvenient.

In other words, in the conventional hybrid vehicle motor 50, the coupling 71 becomes an obstruction, making it difficult to remove the cover 67 of the terminal box 65. Therefore, when performing maintenance or inspection of the electrically conductive member 62 or the connection terminal 64 or the like inside the terminal box 65, it is necessary to remove the coupling 71, or the hybrid vehicle motor 50 itself, from internal combustion engine 70.

Moreover, since due to the above reason, it is difficult to remove the cover 67 of the terminal box 65 once the hybrid vehicle motor 50 has been fitted to the internal combustion engine 70, it is necessary to perform the operation for connecting the connection terminal 64 and the power source cable 63 inside the terminal box 65 before assembly. Therefore, when performing the assembly of the hybrid vehicle motor 50 to the internal combustion engine 70, it is necessary for the operator to handle the hybrid vehicle motor 50 with the power source cable 63 in a connected condition, so there is the inconvenience of poor operability.

Secondly, in the conventional wiring structure where the electrically conductive member 62 leading from the bus ring 60 is covered by a fluorocarbon insulating material, the material itself is expensive, and there is the additional inconvenience in that when forming the insulating coating, it is necessary to apply a protective treatment to parts where the surface treatment and insulation treatment is not required, so the actual manufacture of the electrically conductive member 62 is time consuming, and product costs are high.

SUMMARY OF THE INVENTION

The object of the present invention is to solve the aforementioned problems and a wiring structure for a hybrid vehicle motor is provided which is capable of providing an improved maintenance capability of the power source cable, and capable of reducing the product cost.

In order to achieve the above object, the present invention provides the following wiring structure.

The first aspect of the invention provides a wiring structure for a hybrid vehicle motor arranged between an internal combustion engine and a transmission comprising an electrically conductive member which performs collection and distribution of electricity for a coil of the hybrid vehicle motor, a connection terminal which electrically connects the electrically conductive member and a power source cable, and a terminal box accommodating the connection terminal, wherein the electrically conductive member extends from the hybrid vehicle motor to the transmission side, and the terminal box is provided so as to extend to the transmission side.

The aforementioned aspect of the present invention, by providing the terminal box for connecting the power source cable to the electrically conductive member which performs collection and distribution of electricity for the coil of the motor, so as to extend from the outside face of the motor to the transmission side adjacent to one side of the motor, it is possible not to overlap the terminal box with auxiliary equipment and the like connected to the internal combustion engine which is adjacent to the other side of the motor. As a result, the operation for connecting the power source cable to the electrically conductive member using the connection terminal provided inside the terminal box, can be executed without interference from the auxiliary equipment.

According to the second aspect of the present invention, in the wiring structure according to the first aspect, the electrically conductive member passes through an opening provided in a housing of the hybrid vehicle motor, and is arranged obliquely from inside of the housing of the hybrid vehicle motor towards the transmission side.

According to the aforementioned structure according to the second aspect, the terminal box can be easily arranged on the transmission side, without exposing the electrically conductive member to outside of the motor housing, and without a complicated wiring set-up.

According to the third aspect of the present invention, in the wiring structure according to the first or second aspect, the terminal box is arranged between cooling piping connected to the internal combustion engine, and the transmission housing.

The connection of the cooling piping to the internal combustion engine is normally performed through a coupling fitted to the internal combustion engine. However, according to the aforementioned wiring structure according to the third aspect, because the terminal box is arranged between the cooling piping and the housing of the transmission, the terminal box can be arranged at a position away from the coupling fitted to the internal combustion engine. As a result, when performing connection work and maintenance work on the electrically conductive member and the power source cable at the connection terminal inside the opened terminal box, interference of the coupling of the cooling piping with the terminal box can be lessened, enabling an improvement in workability.

According to the fourth aspect of the present invention, in the wiring structure according to one of the first, the second, or the third aspects, the electrically conductive member is covered by an insulation cover made of resin, and a drainage hole is provided in the insulation cover.

According to the aforementioned wiring structure according to the fourth aspect, it is possible to achieve insulation of each of the electrically conductive members at low cost by covering the electrically conductive member with an insulation cover made of resin. In this case, when at worst, water enters the insulation cover, the insulation performance decreases. However, according to this aspect, because a drainage hole is provided in the insulation cover, a stable insulation performance can be retained by removing the water through the drainage hole.

According to a fifth aspect of the present invention, in the wiring structure according to the fourth aspect, a protruding member is provided on the insulation cover, arranged so as to minimise a space between the electrically conductive member and an inner face of the terminal box, when the electrically conductive member is connected to the connection terminal.

According to the aforementioned wiring structure according to the fourth aspect, by providing the protruding member on the insulation cover, then in a condition with the electrically conductive member connected to the connection terminal, the space between the electrically conductive member and the inner face of the terminal box is covered by the protruding member. Therefore it is possible to prevent objects such as a fastening screw for the connection terminal, from dropping from the space between the electrically conductive member and the inner face of the terminal box, through the opening to inside the motor. As a result, it is possible to ensure the size of the opening is sufficiently large, so that workability can be improved when arranging the electrically conductive member so that it passes from the opening to inside the terminal box.

DETAILED DESCRIPTION OF THE INVENTION

Hereunder is a description of a wiring structure for a hybrid vehicle motor according to a first embodiment of the present invention, with reference to the drawings.

Figure 1:
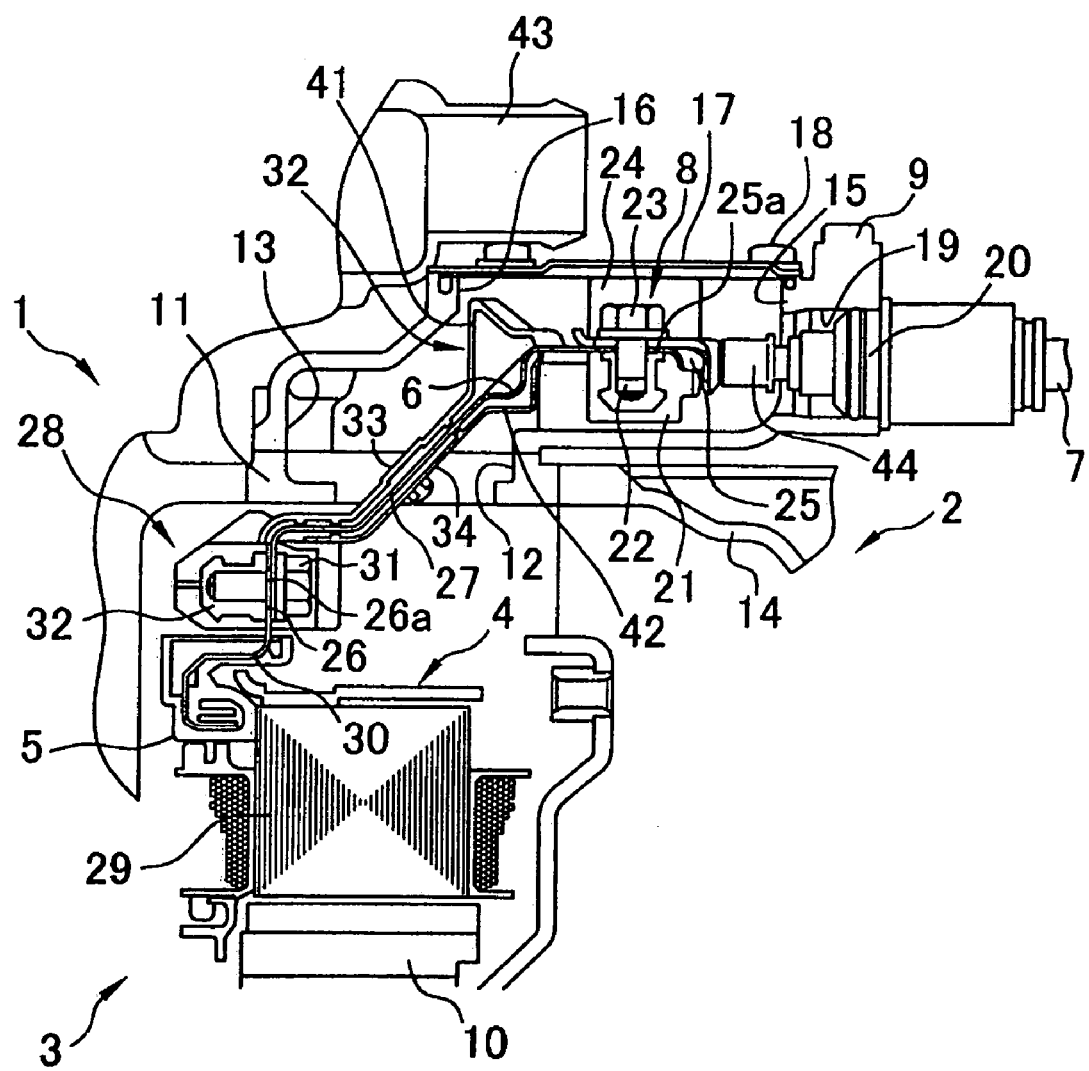
FIG. 1 is a longitudinal section showing a wiring structure for a hybrid vehicle motor according to an embodiment of the present invention.
Figure 2:
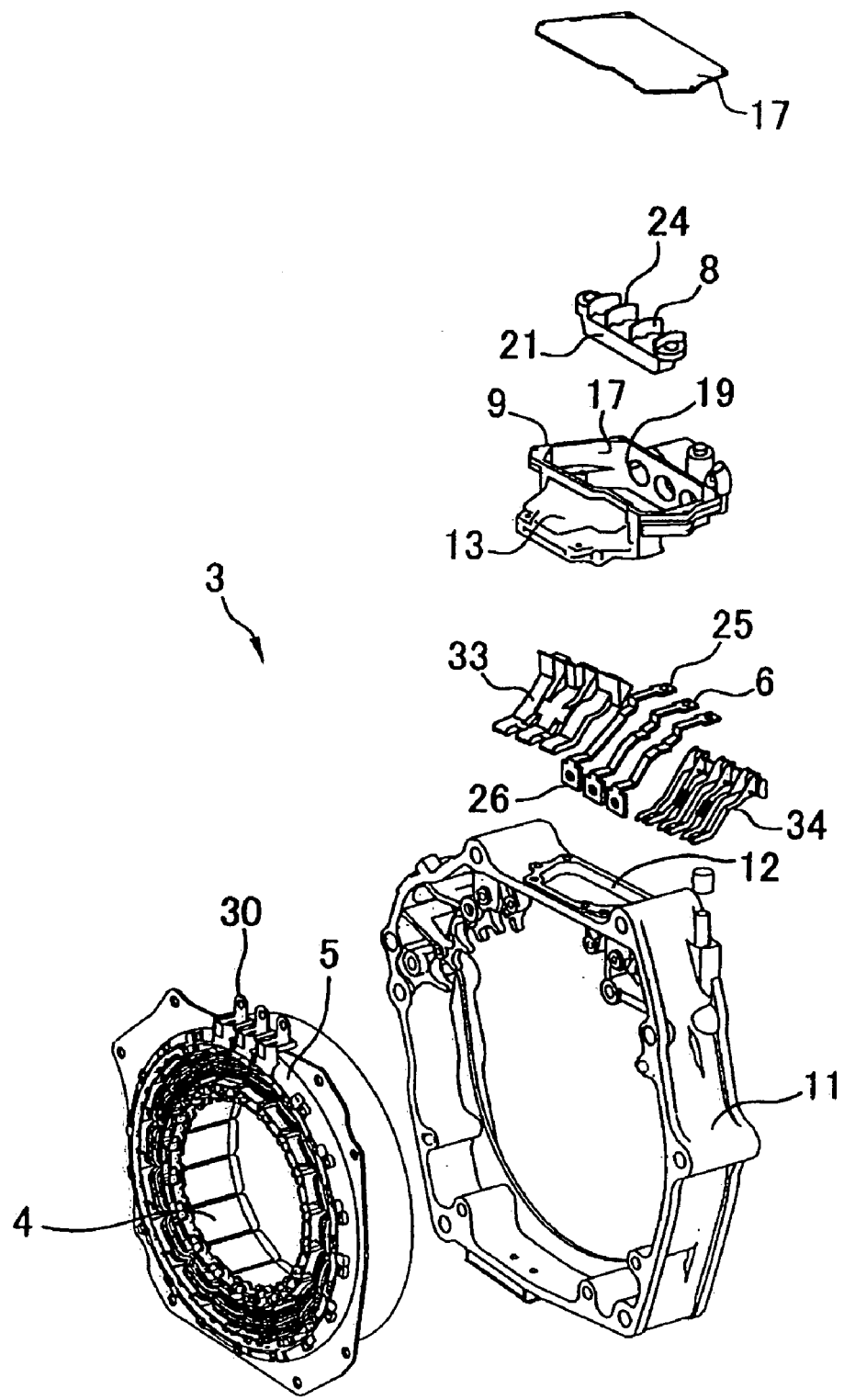
FIG. 2 is an exploded perspective view showing members constituting the wiring structure of FIG. 1.

As shown in FIG. 1 and FIG. 2, the wiring structure according to this embodiment is a wiring structure for a hybrid vehicle motor 3 (hereunder simply referred to as a motor) which is interposed between an internal combustion engine 1 and a transmission 2 and is connected to a drive shaft of the internal combustion engine. This wiring structure comprises; a bus bar 6 being a planar electrically conductive member connected to an electricity collection and distribution ring 5 arranged on one side of a stator 4 of the motor 3, a connection terminal 8 for connecting the bus bar 6a to a power source cable 7 which supplies the bus bar 6 with electrical power from a power source (omitted from drawing), and a terminal box 9 which accommodates the connection terminal 8. In FIG. 1, reference symbol 10 denotes a rotor of the motor 3, which is arranged coaxially on the inner peripheral side of the stator 4.

The terminal box 9 is fixed on the upper face of a motor housing 11 which accommodates the motor 3 and its connecting members and sensors and the like. In the motor housing 11 there is provided an opening 12 penetrating radially upwards therethrough. Moreover, in the terminal box 9 there is formed a connecting path 13 communicating with the opening 12, by means of a space between the bus bar 6 and the inner side of the terminal box 9. The terminal box 9 is constructed so as to extend horizontally from the upper face of the motor housing 11 towards the transmission 2 side, that is, towards the upper face of the transmission housing 14, and has a sidewall 15 standing upright above the upper face of the transmission housing 14. Furthermore, the terminal box 9 comprises a cover 17 for closing off an opening 16 formed in an upper part of the side wall 15, and fixing screws 18 for securing the cover 17.

Moreover, in the sidewall 15 on the transmission 2 side of the terminal box 9 there is provided a lead hole 19 for passing the power source cable 7 that supplies electrical power from an external power source, through to inside the terminal box 9. Three of these lead holes 19 are provided for the power source cables 7 of each phase, and as shown in FIG. 1, with the power source cable 7 inserted therethrough, by fitting a bush 20 which is mounted on the power source cable 7, these can be sealed in a fluid-tight condition The connection terminal 8 is accommodated inside the terminal box 9, and has a bracket 21 comprising an insulating material which is secured to the terminal box 9, an insert screw portion 22 which is secured to inside the bracket 21, and a fastening screw 23 fastened to the insert screw portion 22. Insert screws portions 22 are provided in three places corresponding to each phase of the three phase alternating current, and each insert screw portion 22 is separated by a partition wall 24 provided on the bracket 21, to ensure that a short-circuit does not occur therebetween.

The bus bar 6 is a strip member made of an electrically conductive material, and is formed by punching and bending by press working so as to have connecting portions 25 and 26 on opposite ends, formed with connecting holes 25a and 26a, and a joining portion 27 connecting between the connecting portions 25 and 26. The bus bar 6 is fastened by the fastening screw 23, with the connecting hole 25a of the terminal portion 25 provided on one end of the bus bar 6 corresponding with the insert screw portion 22 of the connection terminal 8.

Furthermore, the connecting portion 26 provided on the other end of the bus bar 6 is connected to the electricity collection and distribution ring 5 arranged on one side face of the stator 4 of the motor 3. A connection terminal 28 similar to the connection terminal 8 is secured to the inside of the motor housing 11 radially outward from the stator 4. Three external connection terminals 30 for picking up and delivering electricity to the coils 29 of the respective phases of the stator 4 extend radially outward from the electricity collection and distribution ring 5, and the bus bar 6 and the electricity collection and distribution ring 5 of the motor 3 are connected by connecting both the external connection terminals 30 and the connecting portions 26 of the bus bars 6 to insert screw portions 32 with fastening screws 31.

Figure 3:
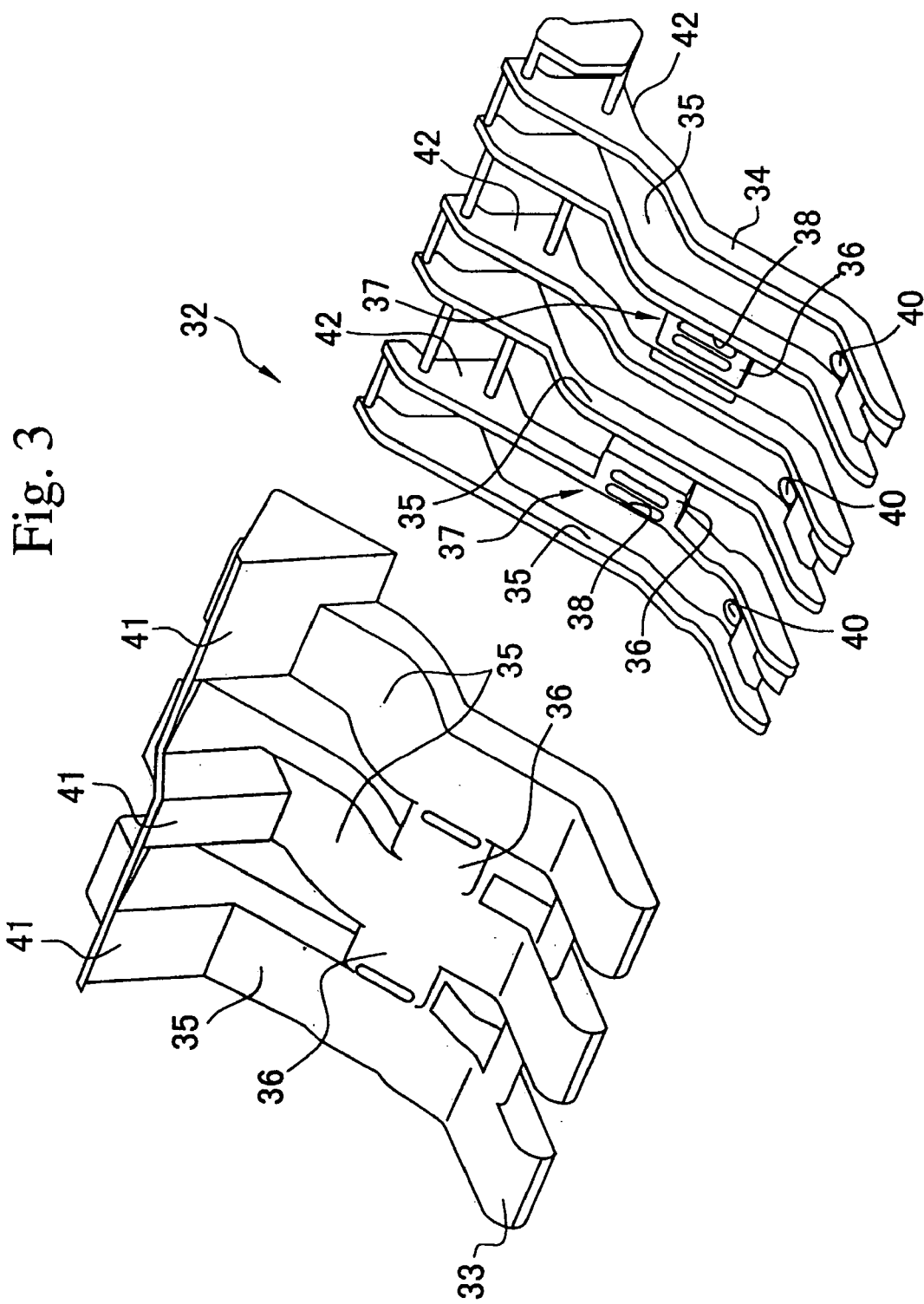
FIG. 3 is an exploded perspective view showing an insulation cover for electrically conductive members used in the wiring structure of FIG. 1.
Figure 4:
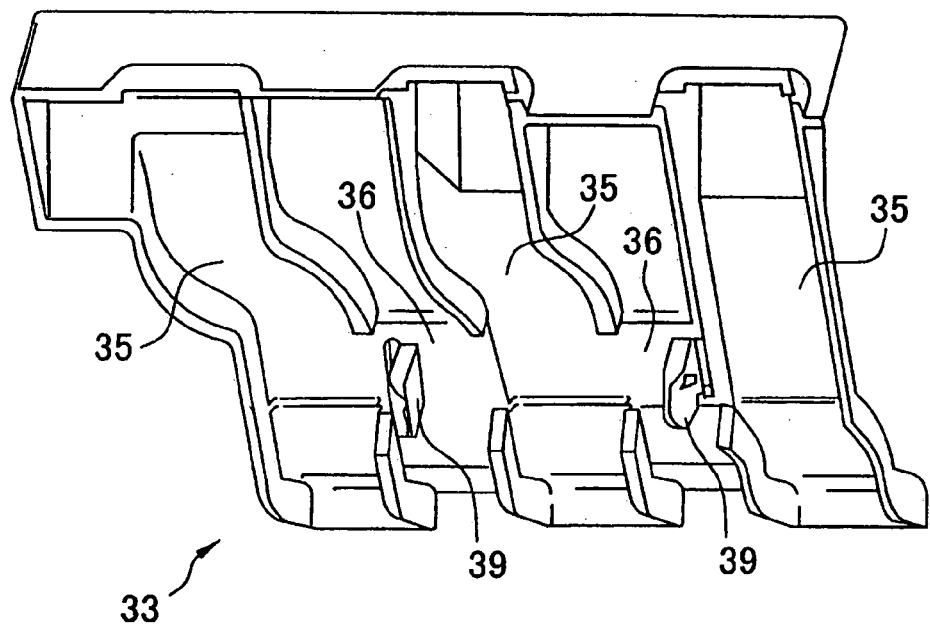
FIG. 4 is a perspective view showing the reverse side of an upper cover member constituting the insulation cover of FIG. 3.

The three bus bars 6 are covered by an insulation cover 32, made for example from an insulating resin material such as nylon. As shown in FIG. 3 and FIG. 4, this insulation cover 32 comprises a pair of upper and lower cover members 33 and 34 which are combined so as to hold the three bus bars 6 therebetween in the thickness direction. In these cover members 33 and 34 there is provided accommodating portions 35 for accommodating the three bus bars 6, and connecting portions 36 for connecting the accommodating portions 35. In the connecting portions 36, there is provided engaging portions 37 for holding the upper and lower cover members 33 and 34 in a connected condition.

The engaging portions 37 comprise engaging openings 38 provided on the lower side cover member 34 and engaging protrusions 39 provided on the upper side cover member 33 which engage with the engaging openings 38 to hold the two cover members 33 and 34 in a condition secured on the top and bottom of the bus bars 6. Furthermore, in the lower side cover member 34 there is provided drainage holes 40 penetrating therethrough, at locations which are on the lower side in a condition with the bus bars 6 fitted to the electricity collection and distribution ring 5.

Moreover, on the pair of cover members 33 and 34 constituting the insulation cover 32, there is provided protruding portions 41 and 42 each with a lengthwise part protruding in the thickness direction. The protruding members 41 and 42 are provided so as to span the full length in the widthwise direction of the cover members 33 and 34, and when the bus bars 6 fitted with the insulation cover 32 are connected to the electricity collection and distribution ring 5, the protrusion 41 and 42 of the insulation cover 32 completely block the opening 13 of the terminal box 9 and the opening 12 of the motor housing 11. Moreover, they are formed so as to close-off leaving only a small space.

In configuring the wiring structure according to this embodiment, firstly, with the three bus bars 6 each arranged in the accommodating part 35 of the insulation cover 32, the upper and lower pair of cover members 33 and 34, which constitute the insulation cover 32 are combined. As a result, the engaging protrusions 39 provided on the upper side cover member 33 are engaged in the engaging openings 38 provided on the lower side cover member 34, so that the bus bars 6 are covered by the insulation cover 32. At this time, the connecting portions 25 and 26 provided on the opposite ends of the bus bars 6 are held in an exposed condition. Moreover, as a result the three bus bars 6 become integrally held by the insulating cover 32.

Next, the three bus bars 6 that are integrated in this way are fitted to the connection terminals 8 which are fitted to the motor housing 11. At this time, the bus bars 6 are inserted from the terminal box 9 into the opening 12 interior, and are secured to the connection terminals 28 of the motor housing 11 interior. Furthermore, the external connection terminals 30 which extend from the electricity collection and distribution ring 5 secured to the stator 4, and the connecting portions 26 on one end side of the bars 6, are fastened together by the fastening screws 31 so that the bus bars 6 are secured to the motor 3, and the electricity collection and distribution ring 5 and the bus bars 6 are electrically connected.

Then the bus bars 6 are arranged in the radial outward direction from inside the motor housing 11 to inside the terminal box 9 provided on the outside of the motor housing 11, so as to extend obliquely from the motor 3 to the transmission 2 side.

In this condition, the motor 3 is fitted to the internal combustion engine 1 without the opening portion 16 of the terminal box 9 being closed by the cover 17. Furthermore, the transmission 2 is secured to the motor 3, which is fixed to the internal combustion engine 1. As is shown in FIG. 1, the coupling 43 of the cooling piping extends from the internal combustion engine 1 to above the motor 3. However because the terminal box 9 is arranged at a position offset from above the motor 3, so as to be positioned on the upper face of the transmission 2, the opening 16 is not covered by the coupling 43 of the cooling piping.

Then, the power source cable 7 is passed through the lead hole 19 provided in the sidewall 15 of the terminal box 9 and inserted to inside the terminal box 9, and a crimp-style terminal 44 fitted to the end, and the connecting portion 25 provided on one end of the bus bar 6, are fastened together by fastening the fastening screw 23 to the respective insert screw portions 22 of the connection terminals 8 secured to inside the terminal box 9. Therefore, the power source cable 7 is electrically connected to each coil 29 of the stator 4 via the bus bar 6 and the electricity collection and distribution ring 5.

Thus, the wiring structure for the motor 3 according to this embodiment is configured.

Subsequently, the terminal box 9 is sealed by fitting the cover 17 to the opening 16 of the open terminal box 9 using the fixing screws 18, thereby preventing flooding or the like from the outside.

Next a description is given hereunder of the operation of the wiring structure for the motor 3 of this embodiment. According to the wiring structure for the motor 3 related to this embodiment, the terminal box 9 extends to a position offset from the motor 3 on the upper face of the transmission 2, with the opening 16 at that position. Therefore it is possible to prevent the opening 16 from being covered by auxiliary parts extending from the internal combustion engine 1 to the motor 3 side, particularly the coupling 43 of the cooling piping, even in the condition with the motor 3 fitted to the internal combustion engine 1. Accordingly, the operation for connecting the power source cable 7 to the bus bar 6 inside the terminal box 9 can be performed, even after the motor 3 has been fitted to the internal combustion engine 1.

In other words, with the motor 3 fitted to the internal combustion engine 1, it is possible to deal with the fastening screw 23 inside the terminal box 9, and to open and close the cover 17 of the terminal box 9. Therefore when the motor 3 is fitted to the internal combustion engine 1, it is possible to handle the motor 3 without the heavy power source cable 7 being connected, and it is also possible to perform maintenance on the terminal box 9 interior without removing the motor 3 from the internal combustion engine 1.

Moreover, according to this embodiment, as mentioned above, the bus bar 6 which connects the connection terminal 8 inside the terminal box 9 arranged in a position that is offset to the upper face of the transmission 2, to the electricity collection and distribution ring 5 inside the motor housing 11, is arranged obliquely along the radial and axial directions. Therefore the bus bar 6 itself has a simply configuration, enabling easy manufacture. In addition, the three bus bars 6 are covered and integrated by the insulation cover 32. Therefore the fitting operation for the bus bars 6 can be performed for the three simultaneously, enabling an improvement in workability for the wiring operation.

Figure 5:
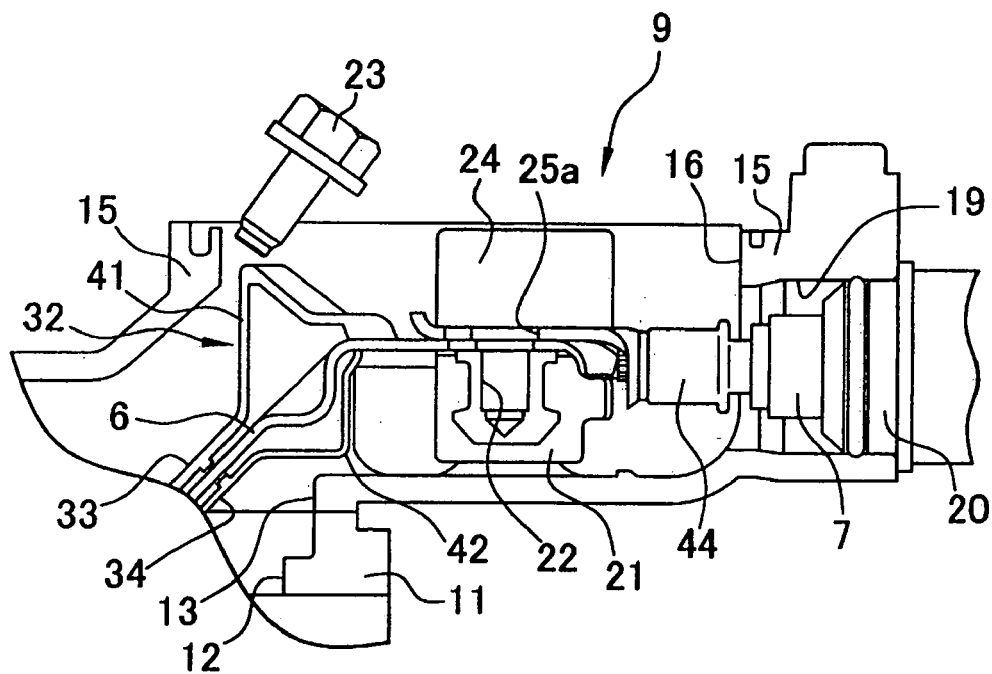
FIG. 5 is a partial longitudinal section for explaining the effect of the insulation cover of FIG. 3 in preventing fastening screws from dropping from the terminal box into the opening.
Figure 6:
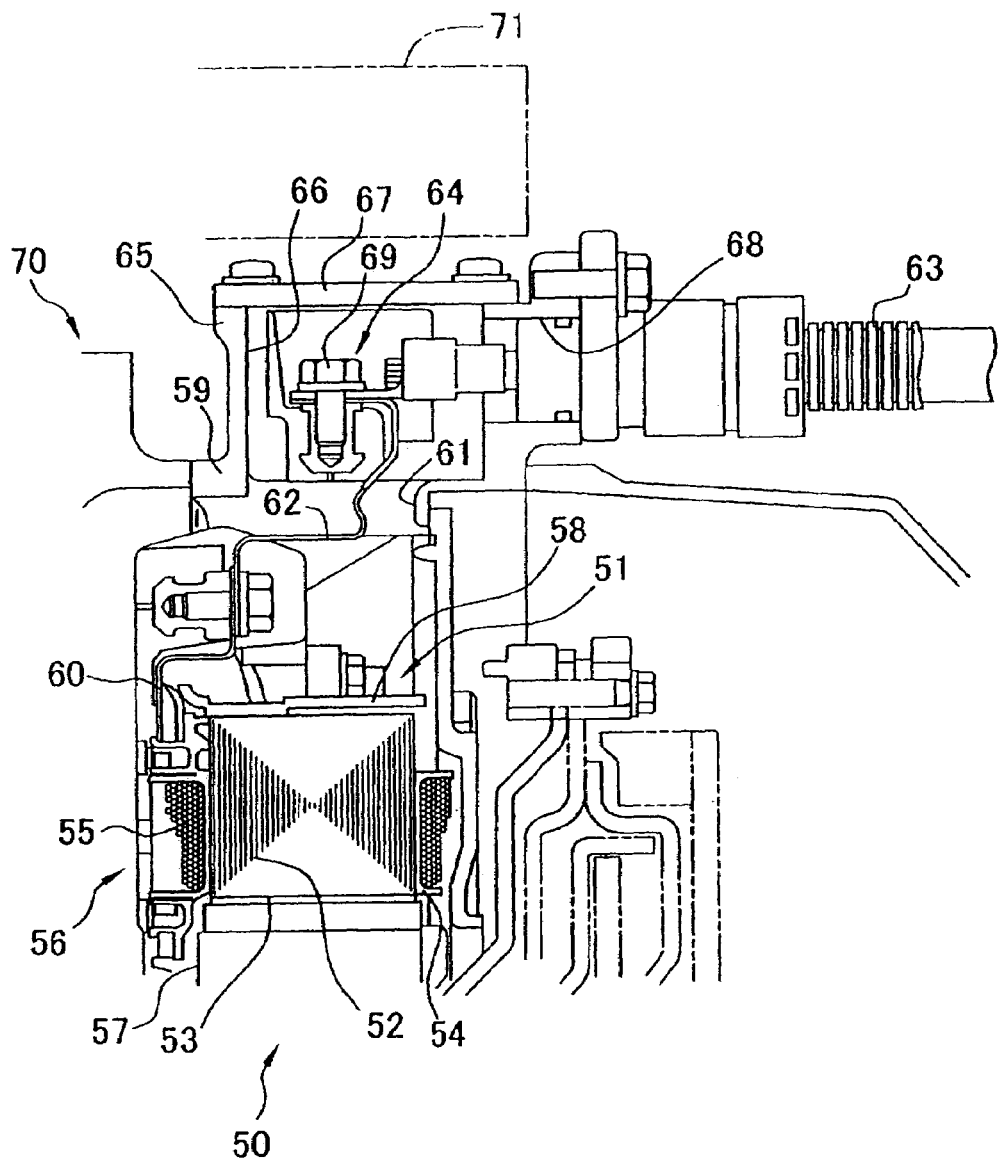
FIG. 6 is a partial longitudinal section showing a conventional wiring structure for a hybrid vehicle motor.

Furthermore, according to the embodiment, instead of the insulation process for the bus bar 6 which is conventionally performed using an insulating film, the bus bar 6 is covered by the insulation cover 32 made from an insulating resin material. Therefore the time required for the insulation process can be reduced and product cost lowered. Moreover, by means of the protruding members 41 and 42 provided on the insulation cover 32 made of insulating resin material, with the bus bars 6 in the fitted condition, the space between the bus bar 6 and the inner face of the terminal box 9 is blocked, or is small enough that the fastening screw 23 cannot pass through. Therefore as shown in FIG. 5, parts such as the fastening screw 23 which fasten together the bus bar 6 and the power source cable 7, can be prevented from potentially dropping from the space between the bus bar 6 and the inner face of the terminal box 9 into the opening 12.

In addition, according to the embodiment, in the case of covering with the insulation cover 32 instead of by means of the insulation process using an insulating film, consideration is given to a drop in the insulation performance when flooding occurs between the insulation cover 32 and the bus bar 6. However in the embodiment, the drainage holes 40 are provided in a portion on the lower side of the insulation cover 32. Hence, water which has intruded in between the insulation cover 32 and the bus bar 6, is discharged from the drainage holes 40, enabling the insulation performance to be retained without any reduction.

In this way, according to the wiring structure of the embodiment, the assembly operation and maintenance work can be performed with ease.

Moreover, the bus bar 6, which is arranged between the electricity collection and distribution ring 5 and the power source cable 7, is reliably insulated easily and at low cost, by means of the insulation cover 32 made from an insulating resin material. Furthermore dropping of foreign bodies such as the fastening screws 23 into the opening 12 can be prevented.

In the embodiment an explanation is given for when the terminal box 9 is arranged on the upper part of the transmission 2. However, the invention is not limited to this arrangement, and needless to say may be applied to cases where the terminal box is arranged in an optional position such as on a side portion of the transmission 2.

Moreover, for the material of the insulation cover 32 the description gives nylon as an example. However instead of this, optional insulating resin materials may be employed.

As is apparent for the above explanations, the invention demonstrates the following effects.

1. According to the wiring structure for a hybrid motor of the first aspect of the invention, by providing the terminal box so that it extends from the outer face of the motor housing to the transmission side, interference with auxiliary parts fitted to the internal combustion engine can be avoided and wiring operations or maintenance work on the terminal box can be easily performed. Consequently, assembly operations are simplified, product costs reduced, and reliability improved. Also the effect is demonstrated where maintenance work is simplified and integrity can be maintained.

2. According to the wiring structure for a hybrid motor of the second aspect of the invention, the effect is demonstrated where the terminal box can be easily arranged on the transmission side, without exposing the electrically conductive member to outside of the motor housing, and without a complicated wiring set-up.

3. According to the wiring structure for a hybrid motor of the third aspect of the invention, the effect is demonstrated where, even though the terminal box is provided in a position overlapped by the cooling piping connected to the internal combustion engine, interference from the cooling piping is decreased, enabling the connection operation in the terminal box to be simplified.

4. According to the wiring structure for a hybrid motor of the fourth aspect of the invention, the effect is demonstrated where the electrically conductive member can be produced easily and at a low cost, and a stable insulation performance can be achieved even against flooding.

5. According to the wiring structure for a hybrid motor of the fifth aspect of the invention, the effect is demonstrated where dropping of foreign objects into the opening from the terminal box can be prevented using the insulation cover. Hence the occurrence of failure or the like of the motor resulting from entry of foreign objects can be prevented.

What is claimed is:

1. A wiring structure for a hybrid vehicle motor arranged between an internal combustion engine and a transmission, comprising:
   an electrically conductive member which performs collection and distribution of electricity for a coil of said hybrid vehicle motor;

a connection terminal which electrically connects said electrically conductive member and a power source cable; and a terminal box accommodating said connection terminal;

wherein said electrically conductive member extends from said hybrid vehicle motor to a transmission side, and said terminal box is provided so as to extend to said transmission side, such that said connection terminal is disposed in said transmission side, and is not disposed directly above the vehicle motor, and wherein said terminal box is disposed between a cooling piping coupling, connected to said internal combustion engine and disposed above said vehicle motor, and a housing of said transmission, such that said connection terminal is not below said cooling piping coupling.

2. A wiring structure according to claim 1, wherein said electrically conductive member passes through an opening provided in a housing of said hybrid vehicle motor, and is arranged obliquely from inside of the housing of said hybrid vehicle motor towards said transmission side.

3. A wiring structure according to either claim 1 or 2, wherein said electrically conductive member is covered by an insulation cover made of resin, and a drainage hole is provided in said insulation cover.

4. A wiring structure according to claim 3, wherein a protruding member is provided on said insulation cover, arranged so as to minimize a space between said electrically conductive member and an inner face of said terminal box, when said electrically conductive member is connected to said connection terminal.

* * * * *